April 25, 1967     F. K. H. NALLINGER     3,316,441
FOG LIGHT SYSTEM WHICH OVERRIDES DIMMER RESISTOR
FOR TURN INDICATOR LIGHTS
Filed March 20, 1964
FIG. I
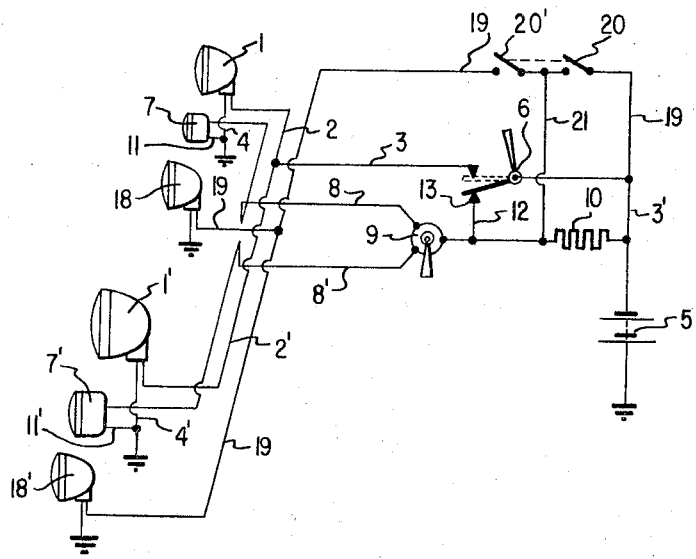
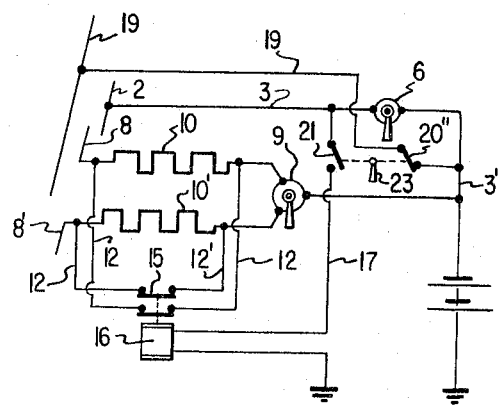
FIG. 2
INVENTOR.
FRIEDRICH K. H. NALLINGER
BY Dicke + Craig
ATTORNEYS.

UNITED STATES PATENT OFFICE 3,316,441
Patented Apr. 25, 1967

3,316,441
FOG LIGHT SYSTEM WHICH OVERRIDES DIMMER RESISTOR FOR TURN INDICATOR LIGHTS
Friedrich K. H. Nallinger, Stuttgart, Germany, assignor to Daimler-Benz Aktiengesellschaft, Stuttgart-Unterturkheim, Germany
Filed Mar. 20, 1964, Ser. No. 353,560
Claims priority, application Germany, Mar. 29, 1963, D 41,249
7 Claims. (Cl. 315—83)

The present invention relates to an installation for giving traffic signals by means of blinker lights, as is customary, for example, in motor vehicles with turn indicators in order to indicate an intended change in the driving direction. These blinker lights must have a relatively strong light intensity in daylight in order to be sufficiently noticeable to the other traffic participants also in bright sunlight. However, it has been found that in this case they exert at night a dangerous blinding effect on the other traffic participants whereby they may constitute the cause of accidents.

Consequently, installations have already been proposed heretofore in which the blinker lights, flashing or lighting-up with strong light intensity during the day; that is, with turned-off vehicle lights, are connected to the current circuit of the remaining vehicle lighting system, for example, to the headlights of the vehicle in such a manner that the light intensity thereof is considerably reduced upon turning on the vehicle lights, for instance, by an additional resistance interconnected into the current circuit of the blinker lights. This can, for example, be realized in such a manner that a voltage-drop resistance arranged in the current circuit of the blinker lights is necessarily and positively short-circuited when turning off the remaining vehicle lights by the switch serving this purpose, or in that when turning on the vehicle lights a relay is connected with a voltage source which interrupts the previously closed short-circuiting line for the resistance by the normally closed contacts.

The present invention relates to a further improvement and development of the known prior art installations in combination with one or several fog lights provided at the vehicle. The present invention essentially consists of an additional switch means which, when turning on the fog lights of the vehicle, switches the blinking turn indicator lights to the full light intensity thereof independently of the switched condition of the remaining vehicle lights.

By the use of such an arrangement, the blinker or flashing effect is reinforced during foggy or misty weather, which is of advantage to the other remaining traffic participants under the poor visibility conditions.

Accordingly, it is an object of the present invention to provide a turn indicator light system for vehicles, especially motor vehicles, which further improves the existing turn indicator light systems by eliminating the aforementioned drawbacks and shortcomings encountered with the prior art constructions.

Another object of the present invention resides in the provision of a turn indicator system for vehicles utilizing blinker-type lights which assures good visibility of the turn indicator lights during foggy or misty weather without danger of blinding other traffic participants during normal night driving while, at the same time assuring sufficient brightness for adequate visibility of the turn indicator signals during daylight driving.

A further object of the present invention resides in the provision of a turn indicator light system for motor vehicles of the type described above which achieves the aforementioned objects by extremely simple and operationally reliable means.

These and other objects, features and advantages of the present invention will become more obvious from the following description when taken in connection with the accompanying drawing which shows, for purposes of illustration only, two embodiments in accordance with the present invention, and wherein FIGURE 1 is a schematic wiring diagram of a first embodiment of a turn indicator light system in accordance with the present invention, and FIGURE 2 is a partial schematic wiring diagram of a modified embodiment of a turn indicator light system in accordance with the present invention.

Referring now to the drawing wherein like reference numerals are used through the two views to designate like parts, reference numerals 1 and 1' (FIG. 1) indicate the main headlights belonging to the light system of a motor vehicle. The headlights 1 and 1' are adapted to be energized by way of lines 2, 2', 3, and 3', which connect the same with one terminal of the vehicle battery 5 as the current source as well as by way of lines 4 and 4' with the ground of the vehicle serving, in the usual manner, as the return conductor to the other grounded terminal of battery 5. The headlights 1 and 1' are adapted to be selectively turned on and off in unison by means of a conventional switch 6 in line 3. The blinker-type turn indicator lights 7, 7' serving for purposes of indicating the driving direction are connected by way of lines 8 and 8', the usual turn indicator switch 9 and a resistance 10 with the line 3' and thus with the one terminal of the vehicle battery 5 as well as by way of lines 11 and 11' with the vehicle ground. The switch 9 is constructed as flashing or intermittently operable switch, of any conventional known construction by means of which, depending on the position of the switch lever thereof, either the blinker light 7 on one side of the vehicle or the blinker light 7' on the other side of the vehicle may be selectively turned on in order to indicate a desired change in the driving direction toward the corresponding side.

A short-circuiting line 12 is connected to the circuit between the switch 9 and the resistance 10 which leads to a stationary contact 13 of the switch 6 and is adapted to short-circuit the resistance 10. The contact 13 is electrically connected by means of switch 6 with the line 3, 3' when the vehicle lights 1 and 1' are turned off. The resistance 10 is thereby bridged to short-circuit the same so that the full battery voltage of battery 5 is applied to the turn indicator lights 7, 7' with the vehicle lights 1, 1' turned off and these turn indicator lights 7, 7' upon actuation of the switch 9 then flash or light up intermittently with corresponding strong light intensity. When turning on the headlights 1 and 1', which usually takes place only during darkness, the line 12 is forcibly and positively disconnected from the line 3' by the switch 6 so that the current for the turn indicator lights 7 and 7' now has to take the path by way of impedance 10 and as a result thereof the light intensity of the turn indicator lights 7 and 7' is considerably decreased.

In FIGURE 2, in which the various lights 1, 1', 7, 7', etc. have been omitted for sake of clarity, one impedance element 10, 10' each is connected in lines 8 and 8' between the switch 9 and a corresponding turn indicator light 7, 7' (not shown). Both resistances 10 and 10' are each bridged or by-passed by a respective short-circuiting line 12 and 12' with the vehicle lights 1 and 1' turned off when the contacts 15 of a switching relay 16 are closed. Upon turning on the vehicle lights by means of switch 6, the energizing coil of relay 16 is at the same time connected by way of a line 17 and closed switch 21 across the full voltage of the current source or battery 5 so that the relay 16 energizes and thus opens the contacts 15 and thereby interrupts or opens the short-circuiting lines 12 and 12'. Consequently, also in this case, the blinker lights 7, 7' are lighted with lesser intensity when the vehicle lights are turned on than during daylight.

The construction so far described is representative of the prior art and does not form part of the present invention. The present invention relates to a vehicle additionally equipped with one or several fog lights 18 and 18' which are supplied with current in the embodiment of FIGURE 1 by way of a line 19. A separate fog light switch 20, 20' is connected in the line 19. A second short-circuiting line 21 branches off from the circuit between the turn indicator switch 9 and the impedance 10 leading to the section of the line 19 between the fog lights 18, 18' and the switch 20, and more particularly between the switches 20 and 20', the latter preventing energization of the fog lights 18, 18' by way of contact 13, line 12 and line 21 when switch 6 is in the position shown in the drawing. The switches 20, 20' may thereby form part of a conventional double pole assembly.

FIGURE 1 clearly illustrates that when the fog light switch 20, 20' is closed and current flows from the battery 5 by way of line 19 to the fog lights 18 and 18', the impedance 10 is also by-passed or short-circuited by the current-carrying line 21, and more particularly independently of the fact of whether the main headlights 1 and 1' are turned off or on by the switch 6. As soon as the turn indicator switch 9 is then actuated, the blinker lights 7, 7' which are thus turned on in addition to the turned-on fog lights 18, 18' are lighted up on the one or the other vehicle side with the same bright light as during daylight energization thereof.

In the arrangement according to FIGURE 2 of the drawing, the line 19 is again provided with a fog light switch 20" which establishes or interrupts the current circuit from the fog lights (not shown) to the battery line 3'. The switch 20" is simultaneously and positively connected with a switch 21 in the line 17 in such a manner that the switch 20" closes when the switch 21 opens and vice versa. If the headlights 1 and 1' (not shown) are turned on by the switch 6, whereby also relay 16 is energized by way of line 17, with a switch 21 closed, and if one actuates the handle 23 of the fog light switch in such a manner that the fog lights 18 and 18' are lighted up because switch 20" has been closed, then by the opening of the switch 21 the relay 16 is simultaneously de-energized, and the by-pass lines 12, 12' are again closed by the contacts 15 with the consequence that now with an actuation of the turn indicator switch 9, the turn indicator lights 7, 7' are again lighted up brightly, independently of the position of the switch 6 which may also be constructed additionally in any conventional manner such that only the dimmed lights of the headlights can be turned on as long as the fog lights remain turned on.

While I have shown and described two embodiments in accordance with the present invention, it is understood that the same is not limited thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. A turn-indicator blinker-light system, comprising:
    a primary vehicle light system,
    blinker-type turn indicator lights,
    a voltage source,
    an energizing circuit for said turn indicator lights including switch means for selectively connecting said turn indicator lights to said voltage source and first means for reducing the brightness of the turn indicator lights upon connecting of primary said vehicle light system to said voltage source,
    fog light means,
    further switch means for selectively connecting said fog light means to said voltage source,
    and second means connecting said first means with said further switch means for de-energizing said first means in response to actuation of said further switch means so that the turn indicator lights are turned on with the full brightness thereof upon energization of the fog light means by said further switch means independently of the condition of energization of said primary vehicle light system.

2. A turn-indicator blinker-light system, especially for motor vehicles, comprising:
    a voltage source,
    a vehicle light system including main headlight means and first switch means for selectively connecting said main headlight means to said voltage source,
    blinker-type turn indicator lights,
    an energizing circuit for said turn indicator lights including second switch means for selectively connecting said turn indicator lights to said voltage source and first means for reducing the brightness of the turn indicator lights upon connecting of the main headlight means of said vehicle light system to said voltage source by said first switch means,
    fog light means,
    further switch means for selectively connecting said fog light means to said voltage source,
    and second means connecting said first means with said further switch means for de-energizing said first means in response to actuation of said further switch means so that the turn indicator lights are turned on with the full brightness thereof upon energization of the fog light means by said further switch means independently of the condition of energization of said vehicle light system by said first switch means.

3. A turn indicator blinker light system, especially for motor vehicles, comprising:
    a vehicle light system including headlight means and first switch means for selectively turning on and off said main headlight means,
    blinker-type turn indicator lights,
    an energizing circuit for said turn indicator lights including second switch means for selectively energizing said turn indicator lights and first means formed by voltage-dropping impedance means for reducing the brightness of the turn indicator lights upon turning on of the headlight means by said first switch means,
    fog light means,
    further switch means for selectively energizing said fog light means,
    and second means operatively connected with said further switch means short-circuiting said impedance means upon energization of said fog light means by said further switch means in such a manner that the turn indicator lights are turned on with the full brightness thereof upon energization of the fog light means independently of the condition of energization of said vehicle light system by said first switch means.

4. A turn indicator blinker light system, especially for motor vehicles, comprising:
    a vehicle light system including headlight means and first switch means for selectively turning on and off said main headlight means,
    blinker-type turn indicator lights,
    an energizing circuit for said turn indicator lights including second switch means for selectively energizing said turn indicator lights and first means for reducing the brightness of the turn indicator lights upon turning on of the headlight means by said first switch means,
    said first means having impedance means in said energizing circuit, short-circuiting means connected in parallel with said impedance means and provided with contact means, and relay means for actuating said contact means and provided with a relay energizing circuit, fog light means, further switch means for selectively energizing said fog light means, and second means operatively connected with said first means for actuating said relay energizing circuit in response to actuation of said further switch means in such a manner that the impedance means are short-circuited and therewith the turn indicator lights are turned on with the full brightness upon energization of the fog light means by said further switch means independently of the condition of energization of said vehicle light system by said first switch means.

5. A turn indicator blinker light system, especially for motor vehicles, comprising:

a vehicle light system including headlight means and first switch means for selectively turning on and off said main headlight means, blinker type turn indicator lights, an energizing circuit for said turn indicator lights including second switch means for selectively energizing said turn indicator lights and first means for reducing the brightness of the turn indicator lights upon turning on of the headlight means by said first switch means, said first means having impedance means in said energizing circuit, short-circuiting means connnected in parallel with said impedance means and provided with contact means, and relay means for actuating said contact means and provided with a relay energizing circuit, fog light means, further switch means for selectively energizing said fog light means, and second means operatively connected with said first means to control the relay energizing circuit in such a manner that the impedance means are short-circuited and therewith the turn indicator lights are turned on with the full brightness upon energization of the fog light means by said further switch means independently of the condition of energization of said vehicle light system by said first switch means, said second means including a switch for said relay energizing circuit which branches off in the circuit of the vehicle light system between the first switch means and the head light means, and said switch being positively connected with said further switch means.

6. A turn indicator system, comprising:

a vehicle light system, first means for selectively energizing said vehicle light system, turn indicator light means, second means for selectively energizing said turn indicator light means including intensity reducing means for reducing the brightness of the turn indicator light means in response to actuation of said first means, fog light means, third means for selectively energizing said fog light means, and fourth means operatively connected with said third means and said second means for rendering ineffectual said intensity reducing means in response to actuation of said third means to energize said fog light means, said fourth means operating independently of the condition of energization of said vehicle light system.

7. A control arrangement for directional indicator lights comprising headlights, blinking directional indicator lights, a source of electrical power, first circuit means including a normally open single pole switch means between said source and said headlights for connecting said headlights with said source, second circuit means including normally short-circuited current limiting resistor means and turn indicator blinker type switch means between said source and said indicator lights for connecting said indicator lights with said source, and third circuit means connected with said single pole switch means for opening the short circuit of said resistor means upon closing of said first circuit by said single pole switch means, whereby the indicator lights are dimmed with energization of the main headlights, fog light means, further switch means for selectively connecting said fog light means to said source of electrical power, and fourth circuit means connecting said current limiting resistor means with said further switch means for short-circuiting said resistor means in response to actuation of said further switch means so that the directional indicator lights are turned on with the full brightness thereof upon energization of the fog light means by said further switch means independently of the condition of energization of said headlights.

References Cited by the Examiner

UNITED STATES PATENTS

| 2,427,076 | 9/1947 | Tabacchi | 315—83 |
| 2,822,505 | 2/1958 | Wilfert | 315—82 |
| 3,040,207 | 6/1962 | Grontkowski | 315—82 X |
| 3,148,306 | 9/1964 | Onksen et al. | 315—82 |

JAMES W. LAWRENCE, *Primary Examiner.*

C. R. CAMPBELL, *Assistant Examiner.*